May 26, 1936.   J. HEIDENHAIN   2,042,049

METHOD FOR THE PRODUCTION OF DIALS, SCALES AND THE LIKE

Filed May 20, 1935

INVENTOR.
Johannes Heidenhain
BY C. P. Goepel
his ATTORNEY.

Patented May 26, 1936

2,042,049

UNITED STATES PATENT OFFICE 2,042,049

METHOD FOR THE PRODUCTION OF DIALS, SCALES AND THE LIKE

Johannes Heidenhain, Berlin-Schlachtensee, Germany

Application May 20, 1935, Serial No. 22,350

2 Claims. (Cl. 95—5)

This invention relates to the production of dials, scales and the like having very fine lines and desired figures. In the various plans heretofore proposed for the making of dials, scales and the like, it has been necessary to use diamond pointed tools to operate upon the transparent plate in the form of glass or the like, and thereupon cause the scratched surfaces to be etched. Such scratching and the consequent etching brings about more or less ragged lines. Also, the making of such dials and the like are very expensive. Furthermore, it has been found that such scratchings and consequent etching could not be carried out in dimensions less than 0.006 millimeter in width, and it is known that the depth of an etching is usually substantially the same as the width, as otherwise no satisfactory lines can be made. All attempts to produce a diamond scratching and consequent etching at less than these dimensions by the diamond scratching process, have failed.

On the other hand, in certain mechanical and optical devices, it has been found to be necessary to have lines on the transparent plates of much finer character than results from an etching of 0.006 millimeter in width and depth and one of the objects of this invention is to provide a method for producing fine lines upon transparent plates, in the form of dials, scales or the like and of a very fine width of, for example, 0.001. It is usual to color these "lines" so as to be more clearly visible, but it has been found that the present state of the art of coloring material does not permit to lay out lines in color of much less than 0.006.

It will be noticed that these dimensions are of the finest character, particularly when compared with the usual dimensions of transparent plates, which in lithography average 1. and in screens about 0.2 millimeter.

The method proposed consists in providing a transparent plate with a layer of lead sulphide; then cutting the layer of lead sulphide with the desired line, figure or design by means of a diamond pointed tool. The characteristics of lead sulphide are such that it provides an exceedingly thin layer, having a very strong adherence to glass or other transparent material. Instead of lead sulphide, any other suitable metal sulphide may be used. Having thus cut a very fine line of the desired dimension and design into this very thin layer of lead sulphide, which is applied to the transparent plate, the so-cut plate is applied to another plate also of transparent character such as glass or the like, which second plate is provided with a very thin layer of lead sulphide having superposed thereon another layer of photographic material. By placing the first transparent plate with its cut-out portion in the lead sulphide layer, in reverse position upon the second glass plate, the light passes through the cut-out in the lead sulphide layer and thereby hardens the photographic layer. The uppermost or first plate is then removed, and the second plate is subjected to a developing process whereby all the parts of the photographic layer with the exception of the hardened portion are dissolved and caused to disappear.

Thereupon the second plate is subjected to a further process for the removal of all the lead sulphide layer thereon by means of a suitable acid, with the exception of that portion which is covered by the hardened photographic material. The result is a "line" of very sharp contour and of an exceedingly fine width. It is of such a width that it is not visible with the naked eye, and can only be seen with a very high powered microscope. The line that has been described of course can be any suitable figure or design such as is usual in the use of high grade optical instruments or the like.

An alternative method consists in having three plates, the first plate being like plate Number I in the preferred method, in that the sharp pointed diamond tool cuts into the layer of lead sulphide a very fine line. This first glass plate with its lead sulphide and with its line cut therein, is then placed upon a second plate having a lead sulphide layer and a photographic layer. The two plates are placed reverse to each other so that the two lead sulphide layers are close together. Light passing through the cut plate then acts upon the photographic layer. The plates are then separated. The photographic layer is developed; the lead sulphide layer of glass plate Number II is washed away by a suitable acid and there remains a projection of lead sulphide having thereon the hardened photographic layer. This plate Number II is then used as a transfer to a plate Number III, which has a lead sulphide layer and a photographic layer thereon, and is placed in reverse position to plate Number III. As the light passes through plate Number II, throughout all its portions with the exception of the projection thereon of lead sulphide covered by a photographic developed portion, the light acts upon the photographic layer of plate Number III, excepting at the portion where the projection appears on the plate Number II. The plates are then separated and the photographic layer and the lead sulphide are washed away or etched at those places where the light did not enter upon the photographic layer of plate Number III, namely,—at those portions which were covered by the projections of plate Number II. In consequence, there remains on plate III a developed layer of the photographic material and the lead sulphide layer with the exception of the "grooves" which then form the "lines" of plate Number III.

In this alternative form, instead of having a projection upon the finer plate indicative of the lines, dials, scales or the like, depressions or grooves are formed but these grooves have the same exactitude of sharpness of contour and fineness of width and depth as the projections, such grooves having a width of 0.001 millimeters or the like.

In the formation of the plates themselves, the process described in my Patent No. 1,877,310 of September 13, 1932, can be followed in the formation of the lead sulphide layer and in the formation of the photographic layer applied thereto, or any other suitable means for forming the lead sulphide layer and the photographic plate can be used to carry out the present invention.

As heretofore stated, instead of the lead sulphide any other suitable metal sulphide can be used, and instead of glass plate any other suitable transparent plate of suitable material can be used.

In the accompanying drawing.

In the accompanying drawing, the figures show the two methods.

Figure 1:
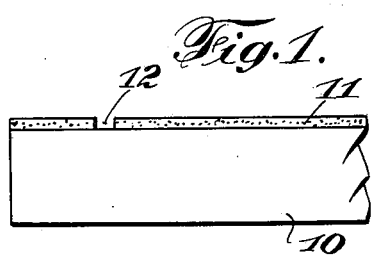
Figure 1 is a side sectional view of a transparent plate with a lead sulphide layer thereon of very great fineness showing also a line therein.

In Figure 1 is shown a transparent plate 10 having a thin layer 11 of lead sulphide thereon, and a fine "line" 12 cut therein.

Figure 2:
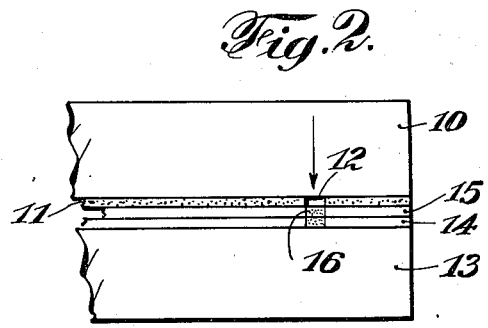
Figure 2 shows the same plate reversed in position, placed over a transparent plate having a lead sulphide layer and a photographic layer.

In Figure 2 is shown another transparent plate 13 with a layer of lead sulphide 14 and a photographic layer 15. The plate of Figure 1 is shown as superposed thereon but in reverse position. The light passes through the cut 12 and hardens the corresponding portion 16. The photographic layer 15 is then washed away, save for the hardened portion. The lead sulphide layer 14 is then washed away, save for the part immediately below the hardened portion 16. Then the plate is ready for use.

Figure 3:
Figure 3 is a similar view as Figure 1, showing the end plate ready for commercial use.

In Figure 3, there is shown the resulting plate.

Figure 4:
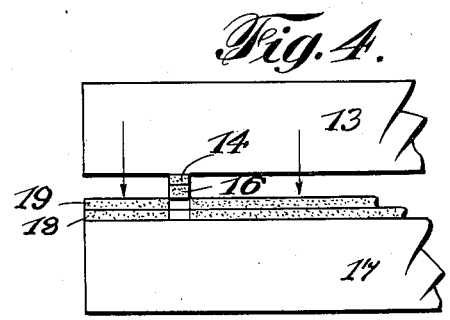
Figure 4 shows an arrangement similar to Figure 2, with however the plate of Figure 3 shown in reverse position.

In Figure 4, two superposed plates are shown, the upper one being like Fig. 3, but in reverse position. The lower one indicated by 17 has a lead sulphide layer 18 thereon with a photographic layer 19 superposed thereon. When light passes through the upper plate 13 through all parts excepting the projection 16, the photographic layer is hardened excepting at this place. Thereafter the top plate 13 is removed, and the plate 17 has its photographic layer developed or washed out at the part 20, and thereafter has the lead sulphide layer removed at this part 20. This part 20 when so treated is formed into a groove 20 which extends down to the glass plate 17, but the plate itself has no grooved portion, since the plate itself is not influenced by the etching process used to remove the lead sulphide.

Figure 5:
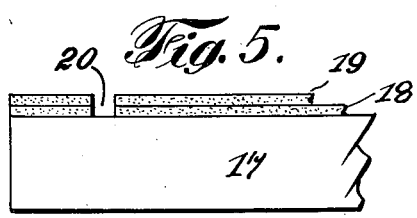
Figure 5 is the end result obtained from the operation of Figure 4.

In the embodiment shown in Fig. 5, the plate has then a groove 20 of very great fineness, whereas the plate shown in Figure 3 has a projection 16 as before described.

Figure 6:
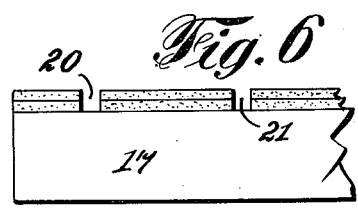
Figure 6 is a sectional view of one of the commercial plates embodying this invention like that shown in Figure 5, excepting that a plurality of lines are shown.
Figure 7:
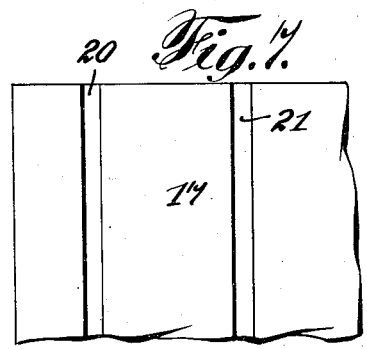
Figure 7 is a plan view thereof to show the accuracy of the contours of the lines.

In Figure 6, there is shown a section, and in Figure 7 a plan view of the structure produced by the method described in accordance with this invention, and particular attention is directed to the fact that the contour margins of the "lines" or grooves 20 and 21 are very sharp and straight and that the grooves are only in the superimposed layer of lead sulphide and not in the transparent plate.

Figure 8:
Figure 8 is a section of a glass plate having lines etched therein shown in exaggerated form to show the irregular contour of the etching.
Figure 9:
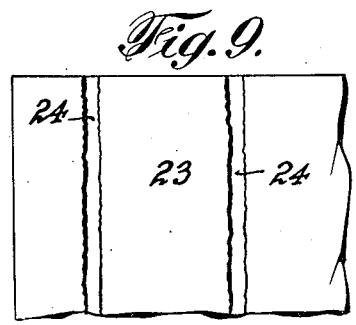
Figure 9 is a plan view of the plate shown in Figure 8, again showing the irregularity of the etching due to irregularities of cutting a glass plate with a diamond point.

In Figure 8 is shown a section and in Figure 9 is a plan view of the prior art glass plate 23 which has been subjected to a diamond cutting apparatus to provide grooves 24 therein and the ragged character of the marginal edges of these grooves are shown in Fig. 9.

It must be understood that the drawings of Figures 7 and 9 are drawings as if taken under a microscope since the naked eye would not be able to perceive these fine distinctions.

The process consists in the following steps:

(1) Taking any suitable transparent plate;

(2) Placing thereon the very thin layer of lead sulphide, of about 0.001 millimeter in depth;

(3) Cutting the lines or numbers of desired figures or designs by means of a diamond pointed tool;

(4) Then taking a second transparent plate covered with lead sulphide and having a photographic film thereon, and placing over it the first plate, so that light passes through the cut designs, the film being then developed and all but the lines which are hard, disappear.

(5) Then etch with acid the lead sulphide layer so as to remove it at all parts thereof except below the developed portion, which leaves the superposed lead sulphide and developed portions, which then form the "lines".

Similar steps are followed when the alternative form of method is employed.

It has been stated that the layer of lead sulphide is very thin, and this thinness is such as to correspond substantially to the width of the lines desired. So, for instance, if a line of 0.001 millimeter in width is desired, the layer of lead sulphide should be made of substantially the same or lower depth. This principle makes the invention applicable to refraction gratings.

Generally speaking, if a plate made under process shown in Figures 8 and 9 costs about $50, plates made in accordance with this invention cost about one tenth thereof, and have the advantage of greater sharpness in delineation.

By the word "lines", I do desire to be understood to include therein, any line, be it straight or curved, or in the form of designs, figures, or the like.

Having thus described my invention in the form and method of producing it and also the article of manufacture made thereby, I do not wish to be limited in the specific steps or specific means shown, since any means within the spirit and scope of my invention as defined by the appended claims would come within my invention.

I claim as new and desire to secure by Letters Patent:—

1. The method of producing dials, scales and the like, which consists in providing a transparent plate with a very thin layer of lead sulphide, cutting lines in such layer of lead sulphide, photographically contact copying said cut layer onto another plate having a thin lead sulphide coating thereon and having a coating of photograph material which will become hardened by exposure to light over the lead sulphide coating, devolving off the non-exposed photographic layer, and removing the unprotected lead sulphide by means of a suitable treating bath.

2. The method of producing dials, scales and the like, which consists in providing a transparent plate with a very thin layer of lead sulphide, cutting lines in such layer of lead sulphide, photographically contact copying said cut layer onto another plate having a thin lead sulphide coating thereon and having a coating of photograph material which will become hardened by exposure to light over the lead sulphide coating, devolving off the non-exposed photographic layer, removing the unprotected lead sulphide by means of a suitable treating bath, then taking the latter plate with the projection thereon corresponding to said lines and applying it to a third plate having a thin layer of lead sulphide with a superimposed layer of photographic material thereon, and then removing from the third plate the photographic film or layer and the lead sulphide layer, corresponding to the "lines" of the second plate, whereby a groove is formed in the third plate of a fineness corresponding to the initial cut of the lines of the first plate.

JOHANNES HEIDENHAIN.